United States Patent [19]
Phillips, Jr. et al.

[11] 4,238,459
[45] Dec. 9, 1980

[54] CHEMICAL BENEFICIATION OF PHOSPHATIC LIMESTONE AND PHOSPHATE ROCK WITH α-HYDROXYSULFONIC ACIDS

[75] Inventors: John F. Phillips, Jr., Florence; Guerry H. McClellan, Killen; John F. McCullough, Florence, all of Ala.

[73] Assignee: Tennessee Valley Authority, Muscle Shoals, Ala.

[21] Appl. No.: 49,513

[22] Filed: Jun. 18, 1979

Related U.S. Application Data

[63] Continuation-in-part of Ser. No. 940,940, Sep. 11, 1978, now Defensive Publication No. T988,006.

[51] Int. Cl.³ .............................................. C01F 11/48
[52] U.S. Cl. .................................... 423/167; 423/173
[58] Field of Search ............... 423/167, 173, 308, 311; 71/33

[56] References Cited

U.S. PATENT DOCUMENTS 4,113,842   9/1978   McCullough et al. ............. 423/167

Primary Examiner—O. R. Vertiz
Assistant Examiner—Wayne A. Langel
Attorney, Agent, or Firm—Robert A. Petrusek

[57] ABSTRACT

A method of selectively extracting calcite and dolomite away from apatite in phosphate rock or phosphatic limestone wherein the phosphate rock or phosphatic limestone is treated with a mixture of sulfur dioxide, water, and a carbonyl compound. Solids are separated from the liquid phase. The solids consist principally of apatite admixed with clay, quartz, and other accessory minerals originally in the rock. The solids are heated to drive off adhering sulfur dioxide, water, and carbonyl. The liquid phase consists of carbonyl, water, sulfur dioxide, and magnesium and calcium ions. Heating this liquid preferentially precipitates $CaSO_3.\frac{1}{2}H_2O$. This solid is filtered off and the filtrate further heated to precipitate $MgSO_3.3H_2O$ largely free of $CaSO_3.\frac{1}{2}H_2O$. All off gas and filtrate is returned to the process.

2 Claims, 1 Drawing Figure

PREPARATION OF APATITE CONCENTRATE FROM PHOSPHATIC LIMESTONE

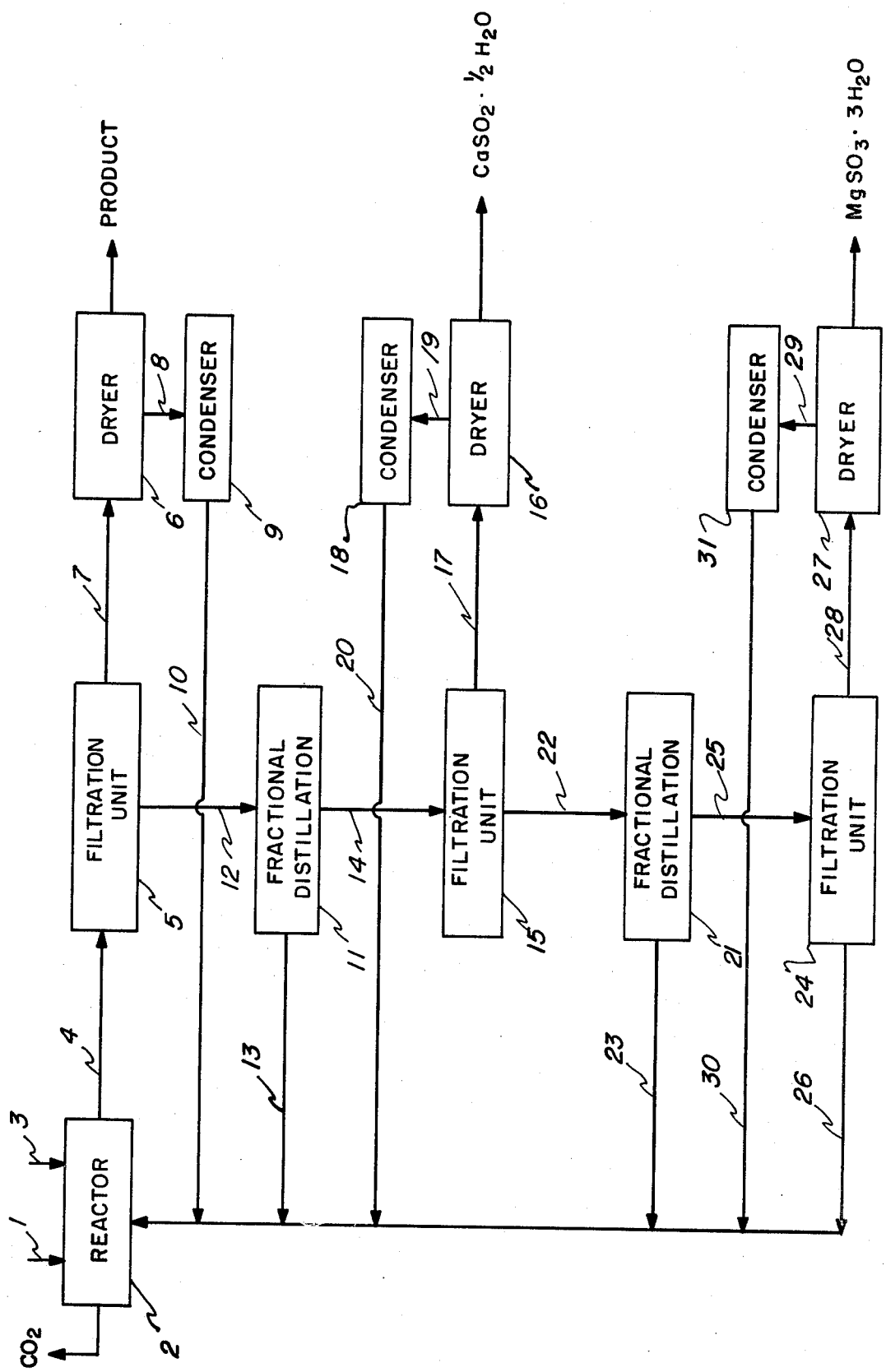

CHEMICAL BENEFICIATION OF PHOSPHATIC LIMESTONE AND PHOSPHATE ROCK WITH α-HYDROXYSULFONIC ACIDS

The invention herein described may be manufactured and used by or for the Government for governmental purposes without the payment to us of any royalty therefor.

This application is a continuation-in-part of patent application Ser. No. 940,940, filed Sept. 11, 1978, for CHEMICAL BENEFICIATION OF PHOSPHATIC LIMESTONE AND PHOSPHATE ROCK WITH ALPHA-HYDROXYSULFONIC ACIDS, now U.S. Pat. No. 7,988,006, issued Nov. 6, 1979.

The present invention relates to a method of beneficiating phosphate rock or phosphatic limestone by chemically leaching metal carbonates from the phosphate rock or phosphatic limestone without significant loss of the phosphate values, and more particularly the instant invention relates to the selective leaching of calcite and/or dolomite from the phosphate rock or phosphatic limestone with a mixture of sulfur dioxide, water, and a carbonyl compound, and still more particularly the instant invention relates to the use of acetone or cyclohexanone as the carbonyl compound.

Phosphorus occurs in phosphate ore as apatite admixed with silica, clays, iron and aluminum phosphates and oxides, dolomite, calcite and other minerals. Although the chemical formula of apatite is often written as $Ca_5(PO_4)_3F$, considerable departure from this formula is possible. Substitution of chloride and hydroxide ions for fluoride ion, carbonate substitution for phosphate and magnesium or sodium substitution for calcium are a few of the many ion substitutions possible. (Lehr, J. R., Proceedings, Fertilizer Industry Round Table, 61, 1967.)

Lehr, supra, shows that the apatite crystallographic a unit-cell dimension is highly correlated to both the degree of substitution and the reactivity of the apatite in the ore. Low apatite unit-cell dimensions (a~9.32 to 9.33 Å) are indicative of highly substituted and reactive apatite while a larger unit-cell dimension indicates a relatively inert apatite with a low degree of substitution. Knowledge of these correlations makes it possible to determine both the degree of apatite substitution and the chemical reactivity of apatite from chemical analysis and the a unit-cell dimension.

Most of the world's phosphate production is used for fertilizer products. Three general types of phosphate ore deposits exist: igneous, sedimentary, and metamorphic. Although all three types supply significant quantities of phosphate to the world market, sedimentary deposits are by far the most important, comprising about 85 percent of the world market. Of the sedimentary deposits, guano-derived rock is only locally important; the really important deposits are of marine origin.

The gangue constituents most commonly associated with unaltered marine phosphorites are quartz, clay minerals, calcite, dolomite, feldspar, metal sulfides and organic matter. Such deposits may undergo post depositional enrichment by ground water or steam activity. Mild ground water leaching tends to remove the more soluble calcium and magnesium carbonates leaving the less soluble calcium phosphate in place. Some of the organic matter may also be removed while sulfides become oxidized to sulfate. Reworking the deposit by stream activity tends to remove clays. If the deposit has not undergone reworking by stream activity, it may still contain most of its original clay content. Then under intensive ground water leaching, the phosphate fraction of the deposit may also be decomposed. Ground water, enriched in phosphate by this process may then react with clay minerals to form aluminum and iron phosphates.

Phosphate rock producers most actively seek reworked and weathered deposits because the ore body contains little magnesium and calcium carbonate. The accessory minerals in these deposits are usually feldspars, quartz, various clay minerals, metal oxides and gypsum. These minerals are removed by a combination of desliming and sizing followed by, in some cases, fatty acid and amine flotation.

Phosphate ores containing silicate-based accessory minerals are particularly amenable to this type of beneficiation [Beall, J. V., Min. Eng. 80–114 (1966); Smani, et al., Trans. Soc. Min. Eng. AIME, 258 168–182 (1975)] because there is sufficient difference in surface properties between silicate and phosphate minerals to allow easy separation by flotation. But as these high-grade weathered deposits are depleted, processors must turn to the more abundant but lower quality carbonate-containing deposits.

The problem of separating calcite and dolomite from apatite in these calcareous deposits is particularly important for several reasons. Calcareous deposits make up about 75–80 percent of the world phosphate reserves (Smani, et al, supra), and both calcite and dolomite are objectionable in the ore because these carbonate minerals consume an excessive amount of sulfuric acid and cause foaming during the conversion of apatite to fertilizer products. Dolomite is particularly objectionable because magnesium passes into and degrades both liquid and solid fertilizer products.

Calcite and dolomite are quite difficult to separate from apatite for several reasons. The minerals are sometimes locked together even when finely ground. Liberating the phosphate values from the carbonate by very fine grinding tends to convert apatite to slime where it causes filtration problems. Fine grinding is also expensive. But the physical separation of calcite and dolomite is still difficult even if the carbonate minerals are liberated from the apatite because, once liberated from each other, their response to physical beneficiation is similar [Rule, A. R., et al, Bu. Mines, RI 7864 (1974)].

Prior art shows that partial separation of carbonate minerals from apatite is possible by depressing apatite with fluosilic acid and floating calcite (Rule, supra). Rule and his fellow workers achieved only a 65-percent phosphorus recovery from unweathered phosphate rock by this method when used in a split flotation circuit. In this example of prior art, calcite comprised a minor fraction (<17 percent) of the phosphate rock ore and was liberated from the ore by attrition scrubbing and grinding in a rod mill. Rule et al further notes that the obtainable phosphorus grade was limited because complete liberation of carbonate from apatite was not possible even with grinding to a very fine size.

Mitzmager et al [Inst. Min. & Met. C233, (1966)] show that it is theoretically possible to float calcite away from apatite with fatty acids by adding monosodium phosphate to the pulp. They teach that dicalcium phosphate, precipitated on the apatite surface, depressed apatite and allows calcite to be floated off. They further teach that the high cost of monosodium phosphate makes the process prohibitively expensive.

Paulo Abib Andery (British Patent Specification 1,086,438, Oct. 11, 1967) has demonstrated that flotation technology can be used to concentrate apatite that occurs in a Brazilian igneous rock with calcite. This art used caustic starch to selectively depress igneous apatite in a fatty acid flotation process that removes the calcite. The unique coarse crystallinity and surface properties of igneous apatites permit their separation from calcite by flotation. However, this art has not been applied successfully to the abundant supplies of sedimentary apatites.

Smani et al, supra, also report separating calcite from apatite by flotation with sodium oleate or sodium dodecylsulfonate. Concentrates of 35 percent $P_2O_5$ were reported, but no mention is made of $P_2O_5$ recovery. If the apatite were locked with the calcite, as is often the case, apatite recovery would be low.

Gokhale et al (Gokhale, K.V.G.K. et al. 11th Int. Min. Proc. Congress, Cagliari, April 1975, page 53) tested a large number of collector depressant combinations including sodium oleate on calcareous phosphate rock and reported that no combination was satisfactory.

Thus the physical separation of carbonates from apatite is difficult both because the apatite and calcite have similar surface properties and because the minerals are physically locked together. Chemical treatment of the rock provides a means of overcoming the problems associated with physical separation. Many workers have recognized this; hence there is a body of prior art concerning chemically beneficiating phosphatic limestone by leaching the alkaline earth carbonates and oxides from the apatite. Calcite, $CaCO_3$, is in general more reactive than dolomite, $MgCO_3(CaCO_3)$; and thus the calcite can be partially leached from the phosphate ore without pretreatment. Researchers have usually calcined dolomitic phosphate rock prior to leaching because uncalcined dolomite is so much less reactive that it cannot be dissolved without dissolving apatite also.

Thus, Rule and coworkers (Bu. Mines RI 7362, 1970) attempted to leach magnesium impurities from calcined western phosphate rock containing 0.84 percent MgO with dilute sulfuric acid, ammonium sulfate or sulfurous acid ($SO_2+H_2O$). Ammonium sulfate solutions extracted 74 percent of the magnesium from rock calcined at 900° C. The method entailed the use of large quantities of ammonium sulfate. These workers also extracted 85.6 percent of the magnesium with a fivefold excess of dilute sulfuric acid. During this extraction there was an unavoidable 6 percent loss of $P_2O_5$ which, the authors state, would have been even larger without precise controls of the digestion conditions. Magnesium extraction was considered satisfactory (88 percent) when a dilute 11.1 percent rock slurry of calcined rock was treated with a 16 percent excess of sulfur dioxide [calculated on the basis of the formation of $Mg(HSO_3)_2$]. A maximum of 72 percent magnesium removal was possible when uncalcined phosphate rock was given an extended treatment with a huge excess of sulfurous acid. Ammonium sulfate and sulfuric acid leaching of uncalcined rock was unsuccessful. Rule et al supply no petrographic analysis of the rock; therefore it is impossible to know if his rock samples contained dolomite. It is possible that some or all of the magnesium was actually present in the rock samples as attapulgite, montmorillonite, vermiculite, or some other magnesium-containing mineral.

The above described prior art has been applied to phosphate ore bodies containing relatively small amounts of calcite (<20 percent) and dolomite (<7 percent). There are also huge deposits of phosphatic limestone in Tennessee and elsewhere which contain many millions of tons of phosphorus (J. A. Barr, U.S. Pat. No. 3,240,559) but are not recoverable by present flotation technology. These deposits contain an unacceptably large amount of calcite and/or dolomite (>40 percent) intimately mixed with apatite. The apatite might possibly be imperfectly liberated from the carbonate minerals by flotation if the phosphatic limestone were ground very fine. But even then phosphate losses would be very large because of the great mass of carbonate mineral which must be removed.

Barr, supra, reports the use of sulfur dioxide and water under pressure (sulfurous acid) for leaching calcite (but not dolomite) from phosphatic limestone. He continuously adds sulfur dioxide, under pressure, to a 16 percent to 18 percent aqueous slurry of phosphatic limestone in a bomb. His teachings required elevated pressure to increase the sulfur dioxide solubility enough to allow the reaction to proceed at a reasonable rate and also increase the solubility of calcium sulfite.

Calcium sulfite hemihydrate, $CaSO_3.\frac{1}{2}H_2O$, is a reaction product as shown below.

$$CaCO_3 + \tfrac{1}{2}H_2O + SO_2 \rightarrow CaSO_3.\tfrac{1}{2}H_2O + CO_2 \uparrow \qquad (1)$$

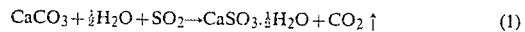

Before the calcium sulfite can be filtered away from the liberated apatite, the sulfite must be dissolved. Fortunately, this occurs in the presence of excess of sulfur dioxide as shown in reaction 2.

$$H_2O + 2CaSO_3.\tfrac{1}{2}H_2O + 2SO_2 \rightleftharpoons 2Ca(HSO_3)_2 \qquad (2)$$

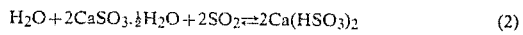

Calcium bisulfite is water soluble. Because of the limited water solubility of sulfur dioxide, calcium solubility in sulfurous acid is low, about 2.6 percent. Elevated pressure, as used in Barr's invention, increases the $SO_2$ solubility and thereby drives reaction 2 to the right, in effect, increasing calcium solubility. Thus, the effect of pressure is directly related to sulfur dioxide solubility. Because elevated pressure in a bomb is required for the satisfactory operation of Barr's invention, the method is inherently a batch operation with limited throughput.

Prior art shows the α-hydroxysulfonic acids have been used in the paper industry, more particularly in the Pritchard-Fraxon process [Ali, S. F. et al, Tappi 51(7), 69A (1968); U.S. Letters Patent No. 3,248,278]. At one point in this process, cations are absorbed from the spent sulfite pulping liquor on an ion exchange resin. Because sulfurous acid is not particularly strong or concentrated, it will not efficiently displace absorbed mono- and divalent cations when the resin is regenerated. By a strong acid, it is meant an acid in which the hydronium ion concentration is large, and by concentration it is meant the mass of $SO_2$ per unit mass of solution.

In the above-mentioned prior art, workers circumvent the difficulty of stripping cations from the resin by adding acetone to the sulfurous acid stripping liquor and thereby increase both the acid concentration and strength of the liquor. This improvement occurs through the formation of an α-hydroxysulfonic acid. Formation of this strong acid both increases the sulfur dioxide concentration and the hydronium ion, $H_3O^+$, concentration as shown in equation 3.

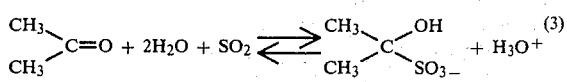

$$\text{CH}_3\text{-C(=O)-CH}_3 + 2\text{H}_2\text{O} + \text{SO}_2 \rightleftharpoons \text{CH}_3\text{-C(OH)(SO}_3^-\text{)-CH}_3 + \text{H}_3\text{O}^+ \quad (3)$$

This solution with the higher hydronium ion concentration more efficiently strips other cations from the resin.

Wilson (U.S. Pat. No. 3,549,319) also teaches that sulfonic acids have other uses in the paper industry. Alkali metal sulfites and ammonium sulfite show advantages over calcium sulfite as pulping agents, but have not gained greater use because they require the use of expensive alkali metal hydroxides or carbonates in their manufacture. Wilson has discovered that these alkali sulfites may now be made directly from various alkali salts through the use of α-hydroxysulfonate intermediates. He reacts carbonyl such as acetone with sulfur dioxide and water at reduced temperature as was shown in equation 3. The sulfonic acid further reacts with an alkali metal salt such as sodium chloride to form the partially soluble sodium α-hydroxysulfonate and hydrochloric acid solution as is shown in equation 4.

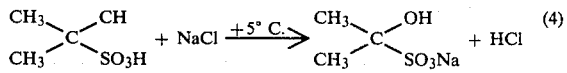

$$\text{CH}_3\text{-C(CH)(SO}_3\text{H)-CH}_3 + \text{NaCl} \xrightarrow{+5°\text{C}} \text{CH}_3\text{-C(OH)(SO}_3\text{Na)-CH}_3 + \text{HCl} \quad (4)$$

Wilson filters off the sodium sulfonate and thermally decomposes it to sodium sulfite, as shown below.

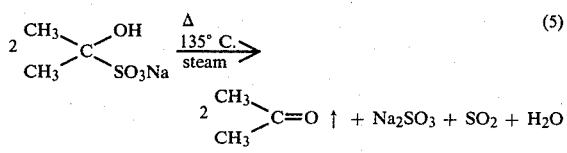

$$2\,\text{CH}_3\text{-C(OH)(SO}_3\text{Na)-CH}_3 \xrightarrow[\text{steam}]{\Delta \; 135°\text{C}} 2\,\text{CH}_3\text{-C(=O)-CH}_3 \uparrow + \text{Na}_2\text{SO}_3 + \text{SO}_2 + \text{H}_2\text{O} \quad (5)$$

Wilson in a later paper (The Industrial Potential of SO$_2$—Carbonyl Compound—Water Mixtures, Proceedings of the Can. Sulf. Symp. U. Calg., Calg., Alberta, Canada, May 30, 1974) elaborates on the use of sulfonic acids in the paper industry and also proposes its use in the preparation of potassium phosphate from potassium chloride. Wilson would, in this proposal, prepare potassium α-hydroxysulfonate from KCl and acetone as in equation 4. He decomposes the potassium sulfonate with phosphoric acid to potassium phosphate, SO$_2$, acetone and water. Although he shows the formation of K$_3$PO$_4$, it is more likely that KH$_2$PO$_4$ would form. He further proposes that the KCl-contaminated dilute hydrochloric acid coproduct be used to make a phosphoric acid from phosphate rock by known procedures. The only known processes for preparing phosphoric acid from phosphate rock and hydrochloric acid involve the separation of phosphoric acid from the acidulate by solvent extraction ("Phosphoric Acid, Vol. 1, Part II," A. V. Slack, ed., page 389, Marcel Dekker, Inc., New York - 1968).

The hydrochloric acid coproduct concentration would, in the examples cited by Wilson et al (U.S. Pat. No. 3,549,319) range from 2.0 to 3.4 M. Although sufficiently concentrated to dissolve phosphate rock, it would yield a product solution too dilute for economical application of solvent extraction procedures. A second serious objection to this proposal is the fact that 12.5 percent or more of the valuable potassium chloride is irrevocably lost to waste during solvent extraction.

In his 1974 paper, supra, Wilson briefly mentioned his study of the solubility of various sulfide and nonsulfide minerals in acetone sulfonic acid solution. He noted that several sulfides were partially soluble in a 70 percent acetone—10 percent SO$_2$—20 percent water mixture and suggested that this discovery might be applied to ion exchange recovery of copper from dilute copper solutions.

The principal object of the present invention is directed toward a rapid and effective method of leaching calcite and/or dolomite from phosphate rock and phosphatic limestone at ambient pressure with little loss of apatite.

In carrying out the objectives of our invention, we deviate significantly from the teachings of Barr and Rule et al by using acetone and/or cyclohexanone in the presence of sulfurous acid to leach calcite and dolomite from phosphate rock and phosphatic limestone. We further deviate from Barr's invention by operating at ambient pressure. These improvements in method of operation confer new and advantageous features to our invention.

More particularly, in pursuing the objects of our invention, we leach carbonate minerals from phosphate rock with a mixture of a carbonyl compound such as acetone or cyclohexanone, sulfur dioxide and water to yield an easily filterable mixture of unreacted apatite, and both calcium and magnesium ions dissolved in the SO$_2$-water-carbonyl mixture. About two moles of sulfur dioxide per gram formula weight calcite and four moles of sulfur dioxide per gram formula weight dolomite are added to the reaction mixture. Somewhat more than four moles SO$_2$/gram formula weight dolomite might be required when treating uncalcined dolomitic phosphatic limestone. The phosphate rock used in some of our tests was usually ground to pass 60 mesh Taylor Series, but rock ground to an even coarser grind worked equally well.

Filtration of the reaction mixture yields a solution of calcium and magnesium bisulfite and a solid highly enriched with apatite. Distillation or stripping sulfur dioxide from the filtrate precipitates magnesium and calcium sulfites, as shown below.

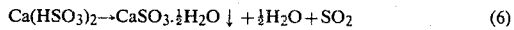

$$\text{Ca(HSO}_3\text{)}_2 \rightarrow \text{CaSO}_3 \cdot \tfrac{1}{2}\text{H}_2\text{O} \downarrow + \tfrac{1}{2}\text{H}_2\text{O} + \text{SO}_2 \quad (6)$$

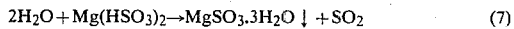

$$2\text{H}_2\text{O} + \text{Mg(HSO}_3\text{)}_2 \rightarrow \text{MgSO}_3 \cdot 3\text{H}_2\text{O} \downarrow + \text{SO}_2 \quad (7)$$

Because CaSO$_3 \cdot \tfrac{1}{2}$H$_2$O preferentially precipitates, it is possible to separate the metal sulfites into a calcium-rich and a magnesium-rich fraction by partial removal of sulfur dioxide and thus recover magnesium sulfite as a valuable byproduct. The calcium and magnesium sulfites are filtered off, and both the filtrate and the distilled sulfur dioxide are recycled to the process. Any acetone or cyclohexanone which comes over in the distillate is also recycled. Efficient distillation will reduce this to a negligible amount. By recycling both distillate and filtrate, all carbonyl is recovered, and the net reaction for calcite leaching becomes equation 1. The analogous reaction for dolomite is shown below.

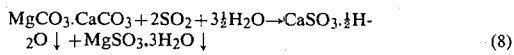

$$\text{MgCO}_3 \cdot \text{CaCO}_3 + 2\text{SO}_2 + 3\tfrac{1}{2}\text{H}_2\text{O} \rightarrow \text{CaSO}_3 \cdot \tfrac{1}{2}\text{H}_2\text{O} \downarrow + \text{MgSO}_3 \cdot 3\text{H}_2\text{O} \downarrow \quad (8)$$

It should be stressed that the carbonate minerals are actually extracted by the α-hydroxysulfonic acid and not sulfurous acid. The carbonyl actively participates in the reaction and its presence is necessary for the successful operation of the instant invention.

In some cases phosphate rock is calcined to remove organic material. During calcination the metal carbonates are converted to metal oxides which, on exposure to water, form metal hydroxides. The present invention is applicable to such calcined rocks.

The general reaction between carbonyls and sulfurous acid is the following:

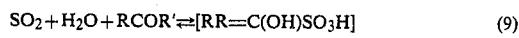
$$SO_2 + H_2O + RCOR' \rightleftharpoons [RR=C(OH)SO_3H] \quad (9)$$

where R and R' represent alkyl and aryl groups or protons. This reversible reaction is favored by low temperature and occurs with most aldehydes and ketones. Although the formation of α-hydroxysulfonic acids from sulfurous acid is quite general for both aldehydes and ketones, there is a wide variation in both the rate of their formation and their thermodynamic stability (Gilbert, "Sulfonation and Related Reactions," page 159, Interscience Publishers, 1965). Aldehydes, in general, yield sulfonic acids which are more stable toward decomposition back to the parent compounds than those derived from ketones. Although stable toward decomposition, many aldehyde-derived α-hydroxysulfonic acids readily react with oxygen and also tend to polymerize on standing (Caughlan, C. N. and Tartar, H. V., "Raman Spectra of Aldehyde and Ketone Bisulfites" J. Am. Chem. Soc. 63 1265-1941). For this reason they are less suitable than ketone-derived acids. Among ketone sulfonic acids, stability decreases as the size of the alkyl group adjacent to the carbonyl is increased. Because of these steric factors, acetone and cyclohexanone form two of the most stable ketone-derived α-hydroxysulfonic acids. Cyclohexanone, because of its structure, forms the more stable of the two.

The strength of many α-hydroxysulfonic acids is considerably greater than sulfurous acid alone. The first ionization constant of the α-hydroxysulfonic acid of benzaldehyde, for example, is $3.7 \times 10^{-2}$ v. $1.72 \times 10^{-2}$ for $H_2SO_3$. (Stewart, T. D., and Donnaly, L. H., J. Am. Chem. Soc. 54 3559-1932).

Sulfur dioxide solubility is considerably higher in water-carbonyl mixtures than in water alone (Wilson, W. J. "The Industrial Potential of $SO_2$-Carbonyl Compounds-Water Mixtures" Proceedings of the Can. Sulf. Symp., U. Calg. Calg. Alberta, Can. May 30, 1974). This combination of increased acid strength and increased $SO_2$ solubility makes sulfonic acids very efficient acidulating agents. Because most sulfonic acids and their salts are decomposed back to the carbonyl by mild heating, it becomes possible to recover the carbonyl for reuse.

An advantage of the present invention over the prior art of Barr and Rule is that the α-hydroxysulfonic acids are intermediate in strength between sulfuric acid and sulfurous acids. This allows the carbonate minerals to be selectively leached from the phosphate matrix without great loss of $P_2O_5$ values. At the same time, the sulfonic acid is strong enough so that sulfur dioxide does not have to be added to the reaction mixture under pressure as is required in the invention of Barr. Operating at atmospheric pressure greatly simplifies the leaching procedure because specially constructed pressure vessels are not required. Without elaborate pressure locks, continuous operation under pressure is not possible, and the process is relegated to a batch operation. By operating at atmospheric pressure, this disadvantage is removed.

A still further advantage of the present invention over the method of Barr is that the calcium reaction products are much more soluble in the reaction mixture in the presence of carbonyl compound. This increased solubility is directly related to $SO_2$ solubility. Equation 2 clearly shows that increased $SO_2$ solubility forces the conversion of insoluble $CaSO_3 \cdot \frac{1}{2}H_2O$ to soluble $Ca(HSO_3)_2$. This increased calcium solubility is very important because the calcium reaction products must be separated from the unreacted apatite. Barr achieves this separation by either using dilute solutions so as to not exceed the solubility product of $CaSO_3 \cdot \frac{1}{2}H_2O$, or he washes away the $CaSO_3 \cdot \frac{1}{2}H_2O$ from the product with copious amounts of water. This is expensive because it adds to the filtration costs and exacerbates the problem of disposing of or treating the calcium sulfite bearing waste.

Another advantage of the present invention is that the acid strength (not to be confused with concentration) of the leaching agent may be easily controlled by varying the concentration of the carbonyl. Such control is not possible when $H_2SO_4$ or similar very strong acids are used for leaching since these strong acids are completely ionized regardless of their concentration. The strong mineral acids such as sulfuric acid are strong at all concentrations and simultaneously attack all accessory minerals and apatite. Thus, when strong acids are used, dissolution of some apatite with the carbonate minerals is almost unavoidable.

Another advantage of the present invention is that the pH of the solution can easily be controlled by adjusting the rate at which $SO_2$ is added to the system. This means thaat a pH region where carbonate minerals but not apatite dissolve can be selected with great precision. The result is that almost no excess sulfur dioxide (over that required to form magnesium and calcium bisulfite) is used when rocks containing calcite or small amounts of dolomite are treated. The $P_2O_5$ losses to the filtrate are minimal, typically less than 5 percent.

Still further advantages and objects of the present invention over prior art will be illustrated by the detailed description of the present invention which is shown below. It should be understood, however, that this more detailed description is given by way of illustration only and not necessarily by way of limitation, since various changes therein may be made by those skilled in the art without departing from the scope and spirit of the present invention.

The detailed description of the present invention refers specifically to the use of acetone as the carbonyl used with uncalcined calcite-based phosphatic limestones, which may or may not contain minor amounts of dolomite, and to the use of acetone as the carbonyl used with calcined dolomite-based phosphatic limestones. A subsequent description is also presented which refers to the use of cyclohexanone with uncalcined dolomitic-based phosphatic limestone. It should be obvious to anyone skilled in the art that cyclohexanone may be used to extract calcite from uncalcined or calcined rocks.

It should also be understood that with minor changes in such operating conditions as temperature and carbonyl concentration, the present invention would work well when used with other carbonyl compounds, particularly when the carbonyl has little steric hindrance about the carbonyl group.

In carrying out the objectives of the present invention, phosphate rock, which contains carbonate minerals, is digested in a mixture of water, acetone, and sulfur dioxide. The rock need not be calcined if it contains less than 3 percent dolomite, but the invention works equally well with calcined rock. Rocks containing more than 3 percent dolomite were satisfactorily processed with acetone if the rock were calcined above 760° C. prior to use. Sulfur dioxide is passed through the agitated mixture of acetone, water and phosphatic limestone until the pH falls to between 2.0 and 1.0. Lower pH is possible, of course, but apatite dissolution may become appreciable below pH one. The phosphatic limestone need not be completely dry before use since water is removed from the system as $CaSO_3.\frac{1}{2}H_2O$ and $MgSO_3.3H_2O$.

The reaction time, reaction temperature, acetone:water weight ratio, $SO_2$ addition rate and rock slurry concentration may be varied over rather wide limits. The process worked well for both calcined and uncalcined rock when the weight ratio of acetone:water ranged from 0.10 to 0.80 and temperature ranged from 20° C. to 45° C. Within the $SO_2$ addition rate range tested (0.10 to 0.60 g/min - 100 g solvent), increased $SO_2$ addition rate had little effect on the amount of calcite removed.

Using uncalcined rock, approximately $\frac{1}{2}$ mole of carbonate per mole of added sulfur dioxide was removed. The average dissolution rate of calcite was three times higher when a flow rate of 0.60 g/min/100 g solvent was used than when 0.2 g/min/100 g solvent. This indicates that in the presence of acetone, all of the added sulfur dioxide rapidly reacted with the carbonate minerals and within the range tested, the calcite dissolution rate was primarily influenced by sulfur dioxide addition rate. More importantly, it means that higher dissolution rates are possible if higher $SO_2$ addition rates are used. A high carbonate dissolution rate is important because smaller sized equipment may be used in the process per unit of product.

The effect of $SO_2$ addition rate on magnesium extraction from calcined and uncalcined rock depended on reaction conditions, but magnesium extraction was acceptable throughout the range. Calcite extraction was favored by lower rock slurry concentration, but within the tested concentration range (9.6 to 19.2 g calcite/100 g solvent), extraction was satisfactory. Magnesium extraction from calcined rock was also satisfactory within the test range (1.1 to 2.2 g Mg/100 g solvent). Magnesium extraction from calcined rock was also favored by high calcination temperature. Although 820° C. was the highest temperature tested, it is obvious to those skilled in the art that calcination temperatures up to 1200° C. would be satisfactory. Beyond this temperature, magnesium and calcium oxides become hard-burned, and unreactive.

Under proper operating conditions, 70 to 90 percent of the dolomite and 85 percent to 100 percent of the calcite are leached from uncalcined phosphatic limestones which are high in calcite and contain minor amounts of dolomite (<3 percent) while greater than 94 percent of the $P_2O_5$ is recovered in the apatite concentrate. Based on the formation of calcium and magnesium bisulfites, the $SO_2$ required in the invention ranges from 10 percent over stoichiometric to actually 10 percent less than stoichiometric. Thus, there is very little loss of sulfur dioxide from the process.

Similarly, near complete extraction of magnesium from calcined rocks containing large amounts of dolomite is also possible with >96 percent $P_2O_5$ recovery in the concentrate. Because calcite is so much more reactive than dolomite, use of conditions which extract magnesium also ensure the extraction of calcite.

The solid portion of these reaction mixtures is mainly apatite mixed with smaller amounts of clay, quartz and other accessory minerals commonly found in phosphate rock. The filtrate is a mixture of water, acetone, sulfur dioxide, and calcium and magnesium ions. The solid and liquid portions of the reaction mixture are easily separated by filtration. Calcium and magnesium in mother liquor adhering to the apatite concentrate may be washed free with water, but this is not necessary since the apatite concentrate readily filters and does not retain much mother liquor. Heating the concentrate to about 110° C. is a preferred way of removing $SO_2$, acetone and water from the concentrate. The offgas is condensed and returned to the process.

As noted previously, the reaction mixture filtrate is a solution of calcium and magnesium ions dissolved in a mixture of acetone, water, and sulfur dioxide. As shown below, magnesium and calcium sulfite can be precipitated from this filtrate by removing sulfur dioxide, thus allowing the carbonyl to be recycled.

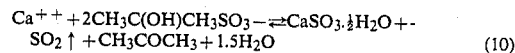

$$Ca^{++} + 2CH_3C(OH)CH_3SO_3 \rightleftharpoons CaSO_3.\tfrac{1}{2}H_2O + SO_2\uparrow + CH_3COCH_3 + 1.5H_2O \qquad (10)$$

Fractional distillation to a distillate temperature of 55° C. drives off enough sulfur dioxide to precipitate >90 percent of the dissolved calcium as $CaSO_3.\frac{1}{2}H_2O$. If the magnesium concentration of the undistilled filtrate is low (<1 percent), no further distillation is required, the calcium sulfite is filtered off and both distillate (mostly $SO_2$) and filtrate are recycled to the process. The precipitation of calcium and magnesium need not be complete since these metals are returned to the process to be moved on subsequent cycles.

During continuous recycling of water and acetone, magnesium will build up in the calcium sulfite filtrate—rapidly if calcined dolomite phosphate rock is used, otherwise slowly. In either case magnesium will also require removal. This is easily accomplished by further distilling the calcium-depleted filtrate to about 75° C. whence $MgSO_3.3H_2O$ also precipitates. Because $CaSO_3.\frac{1}{2}H_2O$ preferentially precipitates when the distillate temperature is maintained below 55° C., it becomes possible to separate the metal sulfites into calcium- and magnesium-rich fractions and thus allows recovery of magnesium sulfite as a valuable byproduct. Alternately, magnesium may be recovered by adding magnesium oxide to the calcium sulfite filtrate. This procedure, which is well known (McGlamery et al, Sulfur Oxide Removal From Power Plant Stack Gas, Magnesia Scrubbing, EPA-R2-73-244, page 20-1973) will precipitate magnesium sulfite as shown below:

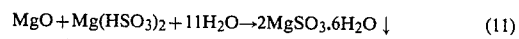

$$MgO + Mg(HSO_3)_2 + 11H_2O \rightarrow 2MgSO_3.6H_2O\downarrow \qquad (11)$$

Uncalcined phosphatic limestones, containing large quantities of dolomite, may be difficult to beneficiate with the sulfonic acid of acetone. Fortunately, these rocks may successfully be beneficiated with the sulfonic acid of cyclohexanone. In this variation of the instant invention, phosphatic limestone, containing large quantities of dolomite, is treated with cyclohexanone-water mixtures where the cyclohexanone:water weight ratio may vary from 0.05 to 0.30. Good results can be had between 50° C. and 90° C. with better results occurring at the higher temperature.

One might predict that it would be impossible to selectively extract dolomite away from very reactive apatite since the difference in reactivity between these two minerals is quite small. However, in testing dolomite extraction from such reactive apatite, we made the wholly unexpected discovery that those operating conditions which tended to increase dolomite extraction, viz, high operating temperature and high rock slurry concentration also inhibited the extraction of $P_2O_5$ from the apatite. Apparently, the mechanism by which apatite dissolves in sulfonic acid is completely different from the mechanism of dolomite extraction. This means that it is possible to select conditions whereby dolomite can be selectively leached from even the most reactive apatite—a result that could not have been predicted beforehand.

Following the reaction, the apatite concentrate is filtered off, and filtrate adhering to the concentrate could be washed free with water or dilute sulfurous acid, but this washing is actually not necessary since the apatite concentrate filters readily and does not retain much mother liquor. Thus, heating the concentrate to >150° C. is a preferred method of removing carbonly, water, and $SO_2$ from the concentrate. The offgas is condensed and returned to the process.

The filtrate is a mixture of cyclohexanone, water, sulfur dioxide, and soluble calcium bisulfite and magnesium bisulfite. The calcium and magnesium can be precipitated from the filtrate, free of each other, by first distilling the filtrate to a distillate temperature of about 55° C. and filtering off $CaSO_3 \cdot \frac{1}{2}H_2O$, then continuing the distillation to precipitate $MgSO_3 \cdot 3H_2O$. Filtrate and distillate are recycled to the process.

The present invention will be better understood from a consideration of additional description in connection with the FIGURE, which is a flowsheet illustrating the principles of our invention.

Referring now more specifically to the FIGURE, phosphate rock from a source not shown, containing carbonate minerals, is fed through line 1 into reactor 2. Water, carbonyl and sulfur dioxide are returned to the reactor from portions of the process which are described later. Additional sulfur dioxide from a source not shown is added to the reactor via line 3 at a rate sufficient to react with the carbonate minerals. Reactor 2 is equipped with a motor-driven agitator, not shown, running at such speed as to secure rapid and intimate mixing of the rock, water, carbonyl and sulfur dioxide. Reaction time required to liberate the carbonate minerals is variable and naturally will depend on sulfur dioxide addition rate, rock charge, and rock composition.

Following digestion, the reaction mixture is fed via line 4 to filtration unit 5 where liquids are separated from the apatite concentrate. The apatite concentrate is sent to dryer 6 via line 7 where carbonyl, sulfur dioxide, and water are removed. The offgas from dryer 6 then goes to a condenser 9 via line 8, and via line 10 returns to the process.

The filtrate from filtration unit 5 is sent to fractional distillation unit 11 via line 12, where sulfur dioxide is partially removed and returned to the process via line 13. The bottoms from the distillation are $CaSO_3 \cdot \frac{1}{2}H_2O$ slurried in water, carbonyl, $SO_2$ and dissolved magnesium ions. This slurry is sent via line 14 to filtration unit 15 where solid $CaSO_3 \cdot \frac{1}{2}H_2O$ is filtered off and sent to dryer 16 via line 17. Carbonyl, adhering water, and $SO_2$ are removed in dryer 16: this offgas is sent to condenser 18 via line 19 and then returned to the process via line 20.

The filtrate from filtration unit 15 is sent to distillation unit 21 via line 22 where, with further distillation, $MgSO_3 \cdot 3H_2O$ also precipitates. The distillate returns to the process via line 23; and the bottoms are sent to filtration unit 24 via line 25, where $MgSO_3 \cdot 3H_2O$ is filtered off. The filtrate, largely water, carbonyl with some dissolved $MgSO_3$ are returned to the process via line 26. The solid $MgSO_3$ crystals are sent to dryer 27 via line 28 where adhering mother liquor is evaporated. Vapors from the dryer are delivered via line 29 to condenser 31 and the condensed vapor then returned to the process via line 30.

In order that those skilled in the art may better understand how the present invention can be practiced, the following examples are given by way of illustration but not necessarily by way of limitation.

EXAMPLE I

Calculated amounts of acetone, water and phosphatic limestone ground to −48/+60 Tyler mesh were added to a thermostated, three-necked flask, fitted with a chilled water condenser, stirrer, and sulfur dioxide delivery tube and allowed to come to thermal equilibria (±0.5° C.). In this test, 40.00 g acetone, 160.00 g water, and 33.99 g of phosphatic limestone were used.

The source of the limestone was the Liepers Formation of the Tennessee Blue Rock Phosphate Rock District in Gordonsburg, Tennessee. Based on the following composition and the a unit cell dimension, this limestone contained 39.3 percent calcite, 45.4 percent apatite, 12 percent quartz, 3 percent clay, and a trace of dolomite (∼0.3 percent).

| Phosphatic Limestone, Liepers Formation, −48/+100 Mesh | |
|---|---|
| Specie | Concentration |
| $P_2O_5$ | 17.8 |
| Calcium | 34.9 |
| Carbon dioxide | 18.3 |
| Iron | 1.9 |
| Aluminum | 0.28 |
| Fluorine | 2.0 |
| Magnesium | 0.18 |

Sulfur dioxide was added to the reaction mixture at a rate of 0.107 g/min for 2.7 h at 25° C. At the end of the reaction period, the solids were filtered off, washed with 50 mL of water and dried at room temperature to yield 18.3 g of black solid containing 28.6 percent $P_2O_5$ and 32.4 percent calcium. These analyses correspond to 95.2 percent removal of calcite with 87 percent $P_2O_5$ recovery in the solid.

EXAMPLE II

A 33.99 g sample of phosphate rock from the Liepers Formation, ground to −150/+200 Tyler mesh, was treated as in Example I. Based on the following composition and the a unit cell dimension, this rock contained 39.2 percent apatite, 47.3 percent calcite, the remainder being quartz, clay, and a trace of dolomite.

| Phosphatic Limestone, Liepers Formation, +150/+200 Mesh | |
|---|---|
| Specie | Concentration |
| $P_2O_5$ | 15.4 |
| Calcium | 35.7 |
| Carbon dioxide | 21.6 |

-continued

| Phosphatic Limestone, Liepers Formation, +150/+200 Mesh | |
|---|---|
| Specie | Concentration |
| Iron | 1.9 |
| Aluminum | 0.28 |
| Fluorine | 1.7 |
| Magnesium | 0.3 |

Sulfur dioxide was passed through the reaction mixture at 25° C. with vigorous agitation for 135 minutes at a rate of 0.151 g/min. The reaction mixture was treated as in Example I to yield 16.57 g of concentrate containing 28.6 percent $P_2O_5$ and 32.4 percent calcium. Based on these analyses, 95.8 percent of the calcite was dissolved while 90.5 percent of the $P_2O_5$ was recovered in the concentrate.

EXAMPLE III

To determine the solubility of sulfur dioxide in acetone-water mixtures, sulfur dioxide was passed through acetone-water mixtures at 25° C. in a three-necked flask equipped with a Tru Bore stirrer and reflux condenser until the flask reached constant weight. The reflux condenser was kept at 10° C. Results are shown below:

| Sulfur Dioxide Solubility in Acetone-Water Mixtures, 25° C. | | |
|---|---|---|
| Acetone, wt. % | Weight ratio, acetone:water | Sulfur dioxide, wt. % |
| 0.00 | 0.00 | 7.6 |
| 4.25 | 0.05 | 10.5 |
| 10.6 | 0.14 | 12.2 |
| 16.5 | 0.24 | 14.7 |
| 19.5 | 0.30 | 15.5 |

EXAMPLE IV

The source of the phosphatic limestone used in this example was the Bigby Formation from the Brown Rock phosphate deposit at Mt. Pleasant, Tennessee. This rock contained 63.9 percent calcite, 1.8 percent dolomite, and 28.7 percent apatite. The apatite, calcite, and dolomite concentrations are based on the use of the a unit cell parameter of apatite and the chemical analysis shown below.

| Phosphatic Limestone, Bigby Formation | |
|---|---|
| Constituent | Concentration, wt. % |
| $P_2O_5$ | 11.2 |
| Calcium | 37.3 |
| Iron | 1.5 |
| Aluminum | 0.15 |
| Fluorine | 1.2 |
| Magnesium | 0.28 |
| Silicon | 2.2 |
| Apatite unit cell dimension, A | 9.353 |

A series of 16 experiments was used to measure the effects of five independent variables on the amount of calcite and dolomite extracted from this uncalcined phosphatic limestone by a solution of water, acetone, and sulfur dioxide. The five independent variables included in this example and the range of experimentation were as follows:

| Experimental variable | Minimum | Maximum |
|---|---|---|
| Weight ratio acetone:water; A/W | 0.25 | 0.75 |
| Temperaure, °C.; | 21 | 40 |
| Rock slurry conc., g $CaCO_3$/100 g solvent; R | 15 | 30 |
| Sulfur dioxide addition rate, g/min/100 g solvent; $SO_2$ | 0.2 | 0.6 |
| Terminal solution pH | 1.25 | 1.75 |

The $P_2O_5$ extracted and the sulfur dioxide use was also measured. The sulfur dioxide use is defined as the moles of sulfur dioxide added per mole of carbonate extracted from the reaction mixture.

Calculated amounts of acetone, water, and phosphatic limestone ground to −60 mesh were added to a thermostated, three-necked flask, fitted with a chilled water condenser, stirrer, and $SO_2$ delivery tube and allowed to come to thermal equilibria (±0.5° C.). Treatments were made in random order, and in all treatments, 100 grams of solvent was used. Sulfur dioxide was passed through the agitated mixture at the calculated rate until the desired pH was reached. Foaming was suppressed by adding two drops of Arizona 301 antifoam. Approximately five minutes before termination of a treatment, two drops of 3.9 percent NP-10 polymethylmethacrylate flocculating agent was added to the reaction mixture. In one treatment, it was not possible to reach the desired pH, and thus the experimental design is not completely orthogonal.

Following the treatment with sulfur dioxide, solids were filtered from the liquid and the solids washed with approximately 100 grams of water and then acetone, and then air dried. Solid, filtrate, and wash liquor were analyzed for calcium and $P_2O_5$. Solids also were analyzed for magnesium.

Calcite and dolomite extracted were calculated from analysis of the leached solid and starting material. The $P_2O_5$ leached from the rock was calculated from $P_2O_5$ recovered from the leached solid and reaction mixture filtrate and wash liquor.

A ½ of a $2^5$ factorial design of experiments was used to delineate the effects of the five independent variables on the amount of calcite and dolomite extracted from the phosphatic limestone. The design required 16 treatments, the results of which are found in Table I infra. Results in this table show that within the region of experimentation, calcite extraction ranged from 78 to 97 percent, averaging 89 percent. Between 49 and 87 percent of the dolomite in the rock was also extracted. In all but one test, the $SO_2$ use was near two, indicating good utilization of the sulfur dioxide. The $P_2O_5$ loss ranged from less than 1.0 percent up to 10 percent, but in most cases the loss was less than 3 percent.

TABLE I

Bigby Phosphatic Limestone Dissolution Results

| Observation | Acetone: Water Ratio | Rock Conc. g/100 g solvent | $SO_2$ Addition rate, g/min/ 100 g. solv. | Reaction temp. °C. | Final pH | Extraction, % Calcite | Extraction, % Dolomite | Extraction, % $P_2O_5$ | Reaction time, min | $SO_2$ use mole $SO_2$/ mole $CO_3$ | Calcite dissolution rate,g/min/ 100 g soln. | $P_2O_5$ in Concentrate % |
|---|---|---|---|---|---|---|---|---|---|---|---|---|
| 1 | 0.75 | 30 | 0.6 | 40 | 1.75 | 83.4 | 53.4 | .78 | 32.11 | 1.76 | .527 | 23.9 |

TABLE I-continued

Bigby Phosphatic Limestone Dissolution Results

| Observation | Acetone: Water Ratio | Rock Conc. g/100 g solvent | SO$_2$ Addition rate, g/min/ 100 g. solv. | Reaction temp. °C. | Final pH | Extraction, % Calcite | Extraction, % Dolomite | Extraction, % P$_2$O$_5$ | Reaction time, min | SO$_2$ use mole SO$_2$/ mole CO$_3$ | Calcite dissolution rate,g/min/ 100 g soln. | P$_2$O$_5$ in Concentrate % |
|---|---|---|---|---|---|---|---|---|---|---|---|---|
| 2 | .25 | 30 | .6 | 40 | 1.33 | 85.5 | 80.8 | .84 | 48.00 | 2.71 | .341 | 24.3 |
| 3 | .75 | 30 | .6 | 21 | 1.25 | 83.5 | 52.8 | .79 | 36.50 | 2.12 | .438 | 24.0 |
| 4 | .25 | 30 | .6 | 21 | 1.75 | 83.4 | 53.1 | .93 | 35.33 | 2.05 | .452 | 24.0 |
| 5 | .75 | 15 | .6 | 40 | 1.25 | 96.6 | 77.4 | 3.48 | 22.00 | 2.20 | .420 | 29.8 |
| 6 | .25 | 15 | .6 | 40 | 1.75 | 79.4 | 57.2 | 1.44 | 15.45 | 1.88 | .490 | 22.7 |
| 7 | .75 | 15 | .6 | 21 | 1.75 | 78.2 | 49.3 | 1.39 | 15.98 | 1.98 | .468 | 22.5 |
| 8 | .25 | 15 | .6 | 21 | 1.25 | 96.9 | 78.4 | 10.11 | 19.75 | 1.97 | .469 | 29.7 |
| 9 | .75 | 30 | .2 | 40 | 1.25 | 94.9 | 66.1 | 2.12 | 120.88 | 2.05 | .150 | 28.9 |
| 10 | .25 | 30 | .2 | 40 | 1.75 | 80.6 | 60.3 | 1.36 | 109.40 | 2.19 | .141 | 22.6 |
| 11 | .75 | 30 | .2 | 21 | 1.75 | 79.7 | 50.4 | .87 | 98.30 | 1.99 | .155 | 22.8 |
| 12 | .25 | 30 | .2 | 21 | 1.25 | 92.4 | 67.0 | .75 | 131.81 | 2.30 | .134 | 27.3 |
| 13 | .75 | 15 | .2 | 40 | 1.75 | 94.9 | 72.9 | 2.96 | 57.65 | 1.96 | .157 | 28.8 |
| 14 | .25 | 15 | .2 | 40 | 1.25 | 96.6 | 87.9 | 1.21 | 63.00 | 2.10 | .146 | 30.2 |
| 15 | .75 | 15 | .2 | 21 | 1.25 | 96.7 | 74.9 | 3.03 | 65.00 | 2.17 | .142 | 31.1 |
| 16 | .25 | 15 | .2 | 21 | 1.75 | 95.0 | 74.6 | 5.09 | 56.00 | 1.89 | .162 | 28.9 |
| 17 | 0.00 | 22.5 | .4 | 30.5 | 1.57 | 48.2 | 100 | 1.47 | 91.50 | 8.00 | .075 | 14.6 |

With reference to Table I, supra, therein it is shown that the calcite dissolution rate ranged from 0.341 to 0.527 g/min/100 g solution averaging 0.450 when the sulfur dioxide addition rate was 0.60 g/min/100 g solution. Similarly the calcite dissolution rate ranged from 0.134 to 0.162, averaging 0.148 g/min/100 g solution when the sulfur dioxide addition rate was reduced to 0.2 g/min/100 g solution. Thus, the average calcite dissolution rate was three times higher when the sulfur dioxide addition rate increased by a factor of three.

To simplify the analysis of the results in Table I, supra, the independent variables were coded to design factors X1 through X5 as follows, where A/W, T, R, SO$_2$, and pH represent the acetone:water ratio, reaction mixture temperature, rock slurry concentration, SO$_2$ addition rate and terminal reaction mixture pH.

$$X1 = (A/W - 0.5)/0.25 \tag{12}$$

$$X2 = (T - 30.5)/9.5 \tag{13}$$

$$X3 = (R - 22.5)/7.5 \tag{14}$$

$$X4 = (SO_2 - 0.4)/0.2 \tag{15}$$

$$X5 = (pH - 1.5)/0.25 \tag{16}$$

The equation $$DVR = A_o = \sum_{i=1}^{5} AiXi + \sum_{i=1}^{5}\sum_{j=1}^{5} AijXiXj, \; k \neq j \tag{17}$$

was used to correlate the extraction results of Table I, supra, to the five design factors X1 through X5 by stepwise linear multiple regression (Applied Regression Analysis Draper, N. R. and Smith, H. P., page 171, John Wiley & Sons, Inc., New York, 1966). The A's in the equation are empirical constants, and DVR represents either calcite and dolomite extracted or P$_2$O$_5$ extracted.

The resulting response equations are as follows:

$$\text{CALCREM} = 88.68 - 3.101X3 - 2.672X4 - 4.310X5 + 3.492X1X2 + 1.342X3X4 + 0.597X3X5 \tag{18}$$

$$\text{DOLREM} = 66.21 - 4.074X1 + 3.649X2 - 5.350X3 - 3.027X4 - 7.210X5 + 2.965X3X4 + 2.496X4X5 \tag{19}$$

$$\text{P}_2\text{O}_5 \text{ Extracted} = 2.340 - 1.248X3 + 0.9376X1X2 + 0.7852X2X3 - 0.8987X4X5 \tag{20}$$

The $R^2$ statistic for the three equations were, respectively, 0.98, 0.90, and 0.71. All terms are significant at the 90 percent confidence level.

EXAMPLE V

To further measure the effects of acetone concentration on calcite removal, an additional treatment of the Bigby Formation Phosphatic Limestone was made as described in Example IV except that acetone-free sulfurous acid was used for extraction. Results of this test is also found in Table I supra.

After careful examination of the results of Examples I through V, it is evident that both calcite and dolomite can be selectively removed from phosphatic limestone by acetone sulfurous acid mixtures with little loss in P$_2$O$_5$ and almost complete utilization of sulfur dioxide. Reference to equation 18 shows that calcite extraction was favored by using a low rock slurry concentration, variable X3, using a lower sulfur dioxide addition rate, variable X4, and operating at a low terminal pH, variable X5. The absence of variable X1 in equation 18, as a main effect, would indicate that on the average acetone had no effect on calcite extraction within the region of experimentation. But the pronounced effect of acetone on calcite extraction is easily discerned by comparing the results of Example IV with Example V. In the absence of acetone (observation 17 of Table I), less than half of the calcite was removed from the phosphatic limestone as compared to an average of 89 percent in Example IV. It is evident that there is a dramatic increase in calcite extraction when the acetone concentration is increased from zero to an acetone:water ratio of 0.25. This marked improvement in calcite extraction parallels the increase in sulfur dioxide solubility with increased acetone concentration (Example III). Thus, efficient calcite removal is actually possible when the acetone:water ratio is somewhat less than 0.25. Comparison of calcite dissolution rates gives further evidence of the favorable influence of acetone. Calcite dissolution rate in acetone-free sulfurous acid was 0.075 g/min/100 g of solution which is about four times lower than would be predicted from results in Example IV. Equally important, the $SO_2$ use was four times larger in acetone-free sulfurous acid than in the presence of acetone. This high $SO_2$ use indicates that in the absence of acetone, only 25 percent of the added sulfur dioxide reacted with the calcite in the rock. The other 75 percent was wasted.

Equation 20 shows that the average $P_2O_5$ loss of the 16 tests of Example IV was only 2.34 percent. The use of a higher rock slurry concentration, variable X3, tended to decrease the $P_2O_5$ loss somewhat. The average effect of other variables was nil.

Reference to equation 19 shows that the average amount of dolomite removed from the rock in the 16 tests was 66.21 percent vs. 88.68 percent for calcite. Dolomite removal was favored by the use of a low acetone:water ratio, variable X1, high extraction temperature, X2, use of a low rock slurry concentration, X3, low sulfur dioxide addition rate, X4, and, especially, low terminal pH, variable X5.

Conditions for extracting calcite from phosphatic limestone would be as follows:

| Acetone water weight ratio | Calcite slurry conc., g/100 g solv | Reaction temp., °C. | Terminal pH | $SO_2$ addition rate, g/min/100 g solv |
|---|---|---|---|---|
| 0.1 to 0.8 | 9 to 20 | 20–45 | 1.0 to 2.0 | 0.2–2.0 |

Because dolomite extraction is favored by high reaction temperature, low acetone concentration and low terminal pH, preferred conditions would be acetone:water ratio 0.1 to 0.25, calcite concentration 10 to 15 g/100 g, pH 1.0 to 1.5, temperature 30° to 45° C., and $SO_2$ addition rate 0.2 to 2.0 g/100 g.

A set of optimum conditions where excellent results can be expected with this rock is acetone:water weight ratio 0.15, initial calcite slurry concentration 10 g/100 g, temperature 40° C., final pH 1.25, $SO_2$ addition rate 0.2 g/min/g calcite. Under these conditions, equations 18, 19, and 20 show that 95.4 percent of the calcite will be removed from the rock, along with 96 percent of the dolomite. The $P_2O_5$ loss would be less than 0.6 percent.

EXAMPLE VI

The source of the rock used in this example was Jhamar Kotra, Block C, in the Udaipur Region of Rajasthan, India. This rock contains 54.9 percent dolomite, 3.3 percent calcite and 39.7 percent apatite. This composition is based on an apatite a unit cell dimension of 9.365A and the chemical composition shown below.

| Constituent | Concentration, wt. % |
|---|---|
| $P_2O_5$ | 16.3 |
| Calcium | 29.0 |
| Magnesium | 7.23 |
| Carbon dioxide | 28.4 |

This rock was chosen for extraction tests because, based on the a unit cell dimension, it is a good example of a dolomitic phosphatic limestone containing unreactive apatite.

A series of 16 experiments was designed to measure the effects of five independent variables on the amount of dolomite and $P_2O_5$ leached from the calcined rock by solutions of water-acetone sulfur dioxide. The five independent variables included in this study and the range of experimentation were as follows:

| Experimental variable | Minimum | Maximum |
|---|---|---|
| Magnesium slurry conc., g/100 g solvent, R | 1.08 | 2.16 |
| Sulfur dioxide flow rate, g/min, $SO_2$ | 0.2 | 0.6 |
| Calcination temperature, °C., temp. | 750 | 820 |
| Terminal reaction mixture pH | 1.25 | 1.75 |
| Acetone:water weight ratio, A/W | 0.25 | 0.75 |

Calculated amounts of phosphatic limestone, ground to −60 mesh, was added to a platinum boat of such size that the depth of the rock was one cm or less. The rock was calcined for two hours at the design temperature, cooled in air for 30 minutes, then added to a calculated amount of acetone and water in a three-necked flask, fitted with a chilled water condenser, stirrer, and $SO_2$ delivery tube and allowed to come to 25° C. ±0.5° C. Treatments were made in random order, and in all treatments 100 g of solvent was reacted with the rock at 25° C. The rock mixture was treated with sulfur dioxide and the apatite concentrate recovered, as in Example IV. The $P_2O_5$ extracted and lost was calculated from analysis of the recovered concentrate, solution and wash liquids.

Examination of the results in Table II, infra, will show that in all cases the $P_2O_5$ extracted from the rock was less than 2 percent and frequently less than 1 percent. Magnesium extraction ranged from 69 percent up to 99 percent.

TABLE II

Results of Extracting Calcined Jhamar Kotra Phosphatic Limestone With Mixtures of Acetone, Sulfur Dioxide and Water

| Observation | Rock conc. g/100 g solv. | $SO_2$ addition rate, g/min/ 100 g solv. | Calcination temp. °C. | Final pH | Acetone:Water wt. ratio | Extraction, % | | Solid composition, % | | |
|---|---|---|---|---|---|---|---|---|---|---|
| | | | | | | Magnesium | $P_2O_5$ | $P_2O_5$ | Mg | Ca |
| 1 | 15 | 0.2 | 750 | 1.75 | 0.25 | 74.2 | 0.20 | 28.9 | 3.42 | 33.9 |
| 2 | 15 | .6 | 750 | 1.75 | .75 | 82.7 | .80 | 32.6 | 2.60 | 36.3 |
| 3 | 30 | .2 | 750 | 1.25 | .25 | 68.7 | .67 | 27.2 | 3.90 | 33.3 |
| 4 | 15 | .2 | 820 | 1.75 | .75 | 93.2 | 1.20 | 35.1 | 1.10 | 36.4 |
| 5 | 15 | .2 | 820 | 1.25 | .25 | 99.1 | .86 | 38.4 | .16 | 38.2 |
| 6 | 15 | .6 | 820 | 1.25 | .75 | 98.2 | .78 | 38.8 | .32 | 38.8 |
| 7 | 30 | .2 | 820 | 1.25 | .75 | 89.0 | .77 | 26.7 | 1.30 | 35.3 |
| 8 | 30 | .6 | 750 | 1.75 | .25 | 82.7 | .56 | 30.6 | 2.50 | 35.6 |
| 9 | 15 | .6 | 820 | 1.75 | .25 | 93.5 | 1.26 | 36.7 | 1.10 | 38.4 |
| 10 | 30 | .6 | 750 | 1.25 | .75 | 86.5 | .43 | 32.6 | 2.00 | 36.4 |
| 11 | 30 | .2 | 820 | 1.75 | .25 | 87.9 | .40 | 32.8 | 1.80 | 37.1 |
| 12 | 30 | .6 | 820 | 1.75 | .75 | 79.9 | .41 | 29.6 | 2.70 | 35.9 |
| 13 | 15 | .2 | 750 | 1.25 | .75 | 76.6 | .80 | 29.6 | 3.20 | 34.0 |
| 14 | 30 | .2 | 750 | 1.75 | .75 | 70.5 | 1.31 | 25.8 | 3.55 | 34.4 |
| 15 | 15 | .6 | 750 | 1.25 | .25 | 91.3 | 1.67 | 35.8 | 1.50 | 36.6 |

TABLE II-continued

Results of Extracting Calcined Jhamar Kotra Phosphatic Limestone With Mixtures of Acetone, Sulfur Dioxide and Water

| Obser-vation | Rock conc. g/100 g solv. | $SO_2$ addition rate, g/min/ 100 g solv. | Calcinaion temp. °C. | Final pH | Acetone:Water wt. ratio | Extraction, % Magnesium | $P_2O_5$ | Solid composition, % $P_2O_5$ | Mg | Ca |
|---|---|---|---|---|---|---|---|---|---|---|
| 16 | 30 | .6 | 820 | 1.25 | .25 | 91.5 | 2.14 | 35.3 | 1.42 | 38.5 |

To better understand the effect of the five variables on magnesium extraction, the five independent variables were coded to design factors X1 through X5 as follows:

$$X1 = (R - 162)/0.54 \quad (21)$$

$$X2 = (SO_2 - 0.4)/0.2 \quad (22)$$

$$X3 = (Temp - 785)/35 \quad (23)$$

$$X4 = (pH - 1.5)/0.25 \quad (24)$$

$$X5 = (A/W - 0.5)/0.25 \quad (25)$$

As in Example IV, equation 17 was used to correlate magnesium extraction results to the coded variables X1 through X5 by stepwise linear multiple regression. No attempt was made to relate the small $P_2O_5$ losses to experimental variables. The resulting equation, shown below, represents the magnesium extraction results of Table II, supra. In this equation, all terms are significant at the 90 percent confidence limit. The $R^2$ statistic is 0.967.

$$MGREMV = 85.30 - 3.26X1 + 2.94X2 + 6.20X3 - 2.30X4 - 1.20X1X3 - 3.70X2X3 - 1.31X2X4 \quad (26)$$

Inspection of equation 26 shows that magnesium removal, MGREMV, is favored by low magnesium slurry concentration (variable X1), high sulfur dioxide flow rate (X2), high calcination temperature (X3) and low terminal solution pH (X4).

A reasonable range of operating conditions would be the following:

| Acetone:water weight ratio | Magnesium slurry conc. % | Calcination temp., °C. | Terminal pH | Sulfur dioxide addition rate g/min/100 g solv |
|---|---|---|---|---|
| 0.1 to .8 | 1.0 to 2.0 | 760 to 1200 | 1.0 to 2.0 | 0.2 to 1.0 |

The lower acetone:water ratio is based on sulfur dioxide solubility data in Example III. Magnesium carbonates calcined above 1200° C. become hard burned and unreactive; thus, the upper limit on calcination temperature is 1200° C. (Sulfur Oxide Removal From Power Plant Stack Gas, Magnesia Scrubbing, EPA R2-73-244, May 1973, page 29, McGlamery et al).

Preferred conditions would be acetone:water weight ratio 0.1 to 0.25, magnesium concentration 1.0 to 1.5, calcination temperature 800° to 1000° C., terminal pH 1.0 to 1.5, and sulfur dioxide addition rate of 0.4 to 0.8 g/min/100 g solvent. An optimum set of operating conditions would include the use of rock calcined at 800° C. This rock would be slurried with enough acetone and water to make a suspension containing 1.1 percent dolomite-derived magnesium and enough acetone to yield an acetone:water weight ratio of 0.15. Sulfur dioxide would be added to this suspension at a rate of 0.6 g/min/100 g solvent until a pH of 1.25 is reached. Under these operating conditions, equation 26 shows that almost 97 percent of the dolomite-derived magnesium will be extracted from the rock.

EXAMPLE VII

The source of the rock used in these extraction tests is Jhamar Kotra, India, the same rock as was used in Example VI. Based on the high apatite unit cell a dimension, the apatite in this rock is relatively unreactive. Prior to use, the rock was ground to −60 mesh.

A series of experiments was designed to measure the effects of two independent variables on the amount of dolomite extracted from uncalcined Jhamar Kotra phosphatic limestone. The experimental procedure used in these tests was similar to that used in Example IV except that cyclohexanone was substituted for acetone. The two independent variables included in this study and the range of experimentation were as follows:

| Experimental variable | Minimum | Maximum |
|---|---|---|
| Cyclohexanone:water weight ratio, C/W | .05 | .15 |
| Reaction temperature °C., temp. | 50 | 75 |

In all tests, 15.00 g of rock was used. This corresponds to a dolomite slurry concentration of 8.24 g dolomite/100 g solvent. A 15.6 percent excess of sulfur dioxide, over stoichiometric, was added to the reaction mixture slurry at a rate of 0.40 g sulfur dioxide/min/100 g solvent. The excess sulfur dioxide was calculated on the basis of the conversion of dolomite and calcite in the rock to magnesium and calcium bisulfites.

The effects of these two variables on dolomite extraction were estimated with a full factorial design of experiments with three replications of the center point and star points along the cyclohexanone:water axis. Nine treatments were required, the results of which are found in Table III below.

TABLE III

Results of Extracting Uncalcined Phosphatic Limestone From Jhamar Kotra, India, With Cyclohexanone, Water and Sulfur Dioxide

| Observation Number | Cyclohexanone: Water wt. ratio | Extraction temp., °C. | Extraction, % Dolomite | $P_2O_5$ | Solid composition, % $P_2O_5$ | Mg | Ca |
|---|---|---|---|---|---|---|---|
| 1 | .050 | 50 | 69.5 | 1.7 | 26.5 | 3.8 | 32.8 |
| 2 | .050 | 75 | 80.8 | 1.6 | 20.7 | 1.9 | 33.4 |
| 3 | .150 | 50 | 74.3 | 3.0 | 29.0 | 3.5 | 33.8 |
| 4 | .150 | 75 | 84.0 | 1.3 | 32.3 | 2.4 | 35.2 |
| 5 | .075 | 62.5 | 71.1 | .81 | 26.7 | 3.5 | 33.3 |
| 6 | .125 | 62.5 | 76.8 | 1.0 | 30.6 | 3.0 | 34.7 |
| 7 | .100 | 62.5 | 77.0 | .8 | 29.9 | 3.1 | 34.5 |
| 8 | .100 | 62.5 | 74.3 | 1.7 | 29.0 | 3.4 | 34.2 |
| 9 | .100 | 62.5 | 71.4 | 2.5 | 28.8 | 3.9 | 34.0 |

To further understand these results, the independent variables were coded to design factors X1 and X2 as follows:

$$X1 = (C/W - 0.1)/0.05 \tag{27}$$

$$X2 = (Temp. - 62.5)/12.5 \tag{28}$$

These coded factors were analyzed for their effect on dolomite extraction by stepwise linear multiple regression of equation 29.

$$DOLREMV = A_o + \sum_{i=1}^{2} A_i X_i + A_{12} X_1 X_2 + A_{11} X_1^2 \tag{29}$$

The resulting prediction equation is shown below:

$$DOLREMV = 73.88 + 2.414 X_1 + 5.229 X_2 + 3.172 X_1^2 \tag{30}$$

All terms were significant at the 90 percent confidence level. The $R^2$ statistic of this equation is 0.865.

EXAMPLE VIII

To investigate the effects of dolomite slurry concentration and sulfur dioxide excess on dolomite extraction by cyclohexanone-water-sulfur dioxide mixtures, several additional tests were made with the Jhamar Kotra rock in the manner described in Example VII. The results of these tests are found below:

| Observation number | $P_2O_5$ in solid, % | Calcium in solid, % | Magnesium in solid, % | Solid wt, % | $SO_2$ addition time, min | Water, grams | Cyclohexanone grams |
|---|---|---|---|---|---|---|---|
| 10 | 31.4 | 34.7 | 2.6 | 5.51 | 24.02 | 90.91 | 9.09 |
| 11 | 29.9 | 33.1 | 3.2 | 15.37 | 52.32 | 76.92 | 23.08 |

| Observation number | $SO_2$ excess % | Cyclohexanone water ratio | Temp., °C. | Rock wt, g | $SO_2$ addition rate, g/min | Dolomite extracted % | $P_2O_5$ extracted % |
|---|---|---|---|---|---|---|---|
| 10 | 26.0 | 0.10 | 90 | 10.00 | 0.40 | 80 | nil |
| 11 | 8.1 | 0.30 | 50 | 25.00 | 0.40 | 73 | nil |

A consideration of the results of Examples VII and VIII indicates that a reasonable range of operating conditions for dolomite extraction from this phosphatic limestone would be as follows:

| Cyclohexanone: water ratio | Dolomite slurry conc., % | Temp., °C. | Sulfur dioxide excess, % |
|---|---|---|---|
| 0.05 to 0.30 | 1 to 15 | 60 to 90 | 8 to 30 |

Inspection of equation 30 further shows that dolomite extraction is favored by use of higher cyclohexanone concentration and higher temperature. Use of excess sulfur dioxide also promotes dolomite extraction. Thus, a preferred range of operating conditions would use a cyclohexanone:water weight ratio range of 0.15 to 0.30, a temperature range of 75° to 90° C. and 10 to 30 percent excess sulfur dioxide over stoichiometric.

EXAMPLE IX

To determine the solubility of sulfur dioxide in cyclohexanone-water mixtures, sulfur dioxide was passed through cyclohexanone-water mixtures at 50° C. in a three-necked flask equipped with a Tru Bore stirrer and reflux condenser until the flask reached constant weight. Results follow:

| Sulfur Dioxide Solubility in Cyclohexanone-Water, 50° C. | | |
|---|---|---|
| Weight ratio cyclohexanone:water | Cyclohexanone conc., wt. % | Sulfur Dioxide, % |
| 0.000 | 0.00 | 3.20 |
| 0.048 | 4.56 | 5.12 |
| 0.085 | 7.84 | 6.85 |

EXAMPLE X

The rock used in these extraction tests came from Djbel Onk, Algeria. Based on the composition shown below and an apatite unit cell a dimension of 9.331A, this rock contained 8.93 percent dolomite, 77.4 percent apatite, and 3.58 percent calcite. The calcite estimate is based on carbon dioxide rather than calcium analysis.

| Chemical Composition of Algerian Phosphate Rock | |
|---|---|
| $P_2O_5$ | 27.92 |
| Calcium | 34.9 |
| Magnesium | 1.39 |
| Carbon dioxide | 9.50 |

In contrast to the Jhamar Kotra rock, the apatite in this rock is highly reactive. This rock was not ground before use. Its size distribution is shown below:

| Tyler mesh size | Fraction, wt. % | Cumulaive wt., wt. % |
|---|---|---|
| +8 | 0.0072 | 0.0072 |
| −8/+14 | 0.533 | 0.541 |
| −14/+20 | 1.35 | 1.89 |
| −20/+28 | 3.44 | 5.33 |
| −28/+35 | 8.08 | 13.41 |
| −35/+48 | 6.21 | 19.62 |
| −48/+65 | 9.97 | 29.58 |
| −65/+100 | 51.65 | 81.24 |
| −100/+150 | 7.50 | 88.73 |
| −150/+200 | 3.94 | 92.68 |
| −200/+270 | 2.74 | 95.41 |
| −270/+400 | 2.96 | 98.37 |
| −400 | 1.63 | 100.00 |

A series of experiments, which measured the effects of four variables on dolomite and $P_2O_5$ extracted from this rock with cyclohexanone-water-sulfur dioxide mixtures, was executed. The four variables and their range of experimentation are shown below:

| Experimental variable | Minimum | Maximum |
|---|---|---|
| Cyclohexanone:water weight ratio, C/W | .05 | .25 |
| Dolomite slurry concentration g/100 g solvent, DOLMITE | 1.34 | 3.13 |
| Reaction temperature, °C., TEMP | 50 | 90 |
| Sulfur dioxide excess, $SO_2$ | −19.42 | 9.68 |

The amount of added sulfur dioxide is based on conversion of all calcite and dolomite in the rock to magnesium and calcium bisulfites.

The effects of the four variables on dolomite and $P_2O_5$ extracted from the rock were estimated with a ½ factorial design of experiments. This design requires eight experiments, the operating conditions and results of which are found in Table IV below.

TABLE IV

Results of Extracting Uncalcined Phosphatic Limestone
From Djbel Onk, Algeria With Cyclohexanone, Water and Sulfur Dioxide

| Observation Number | Cyclohexanone: water wt. ratio | Rock Slurry conc. g/100 g soln. | Extraction temp., °C. | Sulfur dioxide excess, % | Extraction, % Dolomite | Extraction, % $P_2O_5$ | Solid composition, % $P_2O_5$ | Solid composition, % Mg | Solid composition, % Ca |
|---|---|---|---|---|---|---|---|---|---|
| 1 | .25 | 15 | 50 | 9.63 | 62.1 | 18.0 | 29.0 | .78 | 34.5 |
| 2 | .25 | 35 | 50 | −19.5 | 69.8 | 14.1 | 29.7 | .66 | 35.0 |
| 3 | .25 | 35 | 90 | 9.80 | 92.8 | 7.13 | 30.7 | .33 | 35.0 |
| 4 | .05 | 15 | 90 | 9.68 | 88.2 | 5.53 | 30.6 | .46 | 35.3 |
| 5 | .25 | 15 | 90 | −19.4 | 75.8 | 4.16 | 30.2 | .55 | 39.9 |
| 6 | .05 | 15 | 50 | −19.4 | 52.4 | 16.0 | 28.8 | .90 | 34.5 |
| 7 | .05 | 35 | 50 | 9.84 | 89.3 | 8.79 | 30.0 | .37 | 35.3 |
| 8 | .05 | 35 | 90 | −19.5 | 80.5 | 2.17 | 30.3 | .48 | 35.1 |

In the design, the main effects are measured independently of each other, but two factor interactions are confounded with each other.

The four independent variables were coded to the design factors X1 through X4 as follows:

$$X1 = (C/W - 0.15)/0.1 \tag{31}$$

$$X2 = (DOLMITE - 2.235)/0.895 \tag{32}$$

$$X3 = (TEMP - 70)/20 \tag{33}$$

$$X4 = (SO_2 + 4.825)/14.605 \tag{34}$$

These coded factors were analyzed for their effects on dolomite removal and $P_2O_5$ loss by stepwise linear regression of an equation analogous to equation 17. The results are $$\begin{aligned}DOL\text{-}REMV = &76.37 + 6.736X2 + 7.958X3 + 6.723X4 - \\ &2.207(X1X4 + X2X3)\end{aligned} \tag{35}$$

$$\begin{aligned}P_2O_5\,LOSS = &9.489 + 1.359X1 - 1.446X2 - 4.742X3 + \\ &0.6015(X1X2 + X3X4) + 0.6743(X1X4 + X2X3)\end{aligned} \tag{36}$$

All terms are significant at >90 percent confidence level, and the $R^2$ statistic exceeds 0.990.

The results of the eight treatments of the reactive phosphatic limestone in Table IV supra show that dolomite removal ranged from 52 to 93 percent while $P_2O_5$ losses ranged from two to 18 percent. Inspection of equation 35 shows that dolomite extraction from this reactive rock is favored by higher dolomite slurry concentration (X2), higher temperature (X3) and the use of excess of sulfur dioxide (X4). Conditions which favor $P_2O_5$ losses are high cyclohexanone concentration (X1), low dolomite slurry concentration (X2), and low temperature (X3). Thus, the conditions which favor dolomite extraction from reactive phosphate rocks are exactly those which inhibit $P_2O_5$ extraction and loss.

Conditions necessary to extract dolomite from this phosphatic limestone would be the following:

| Cyclohexanone: water ratio | Dolomite slurry conc., g/100 g solv | Temperature, °C. | $SO_2$ excess, % |
|---|---|---|---|
| 0.05 to 0.25 | 1 to 5 | 50 to 90 | 10 to 30 |

The preferred conditions where dolomite extraction is maximized and $P_2O_5$ extraction is minimized would be the following:

| Cyclohexanone: water ratio | Dolomite slurry conc., g/100 g solv | Temperature, °C. | $SO_2$ excess, % |
|---|---|---|---|
| 0.05 to 0.10 | 2.2 to 5.0 | 70 to 90 | 20 to 30 |

EXAMPLE XI

A mixture of 88.0 g water, 22.2 g acetone, 3.51 g magnesium oxide, and 5.61 g calcium oxide was saturated with sulfur dioxide causing the metal oxides to completely dissolve. The solution was fractionally distilled until the head temperature reached 55° C., whereupon the mixture in the distillation flask was cooled and the precipitated solid filtered off, washed with methyl alcohol, dried, weighed, and analyzed.

The filtrate was returned to the distillation flask and the distillation continued until the head temperature reached 90° C. Precipitated solids were filtered, dried, and weighed as before. Results are shown below:

| Distillate temp., °C. | Solid wt., g | Material composition, % MgO | Material composition, % CaO |
|---|---|---|---|
| 55° C. | 13.04 | 0.11 | 43.0 |
| 90° C. | 4.53 | 25.2 | 0.25 |

After sifting and winnowing through the data supra, as well as other results of tests and operation of our new, novel, and improved method of beneficiation of phosphate rock and phosphatic limestone, we now present the following acceptable and preferred ranges of operating conditions to selectively extract calcite from phosphatic limestone with mixtures of sulfurous acid and acetone.

| | Operating range | Preferred |
|---|---|---|
| Acetone:water weight ratio | 0.1–0.8 | 0.1–0.25 |
| Calcite slurry concentration g/100 g | 9–20 | 10–15 |
| Extraction temperature, °C. | 20–45 | 30–45 |
| Solution pH | 1–2 | 1.0–1.5 |

These preferred operating conditions are also suitable for extracting dolomite away from phosphatic limestone when the dolomite concentration is about 3 percent or less.

Acetone-sulfurous acid solutions are also suitable for selectively extracting magnesium from calcined phosphatic limestone under the following acceptable and preferred operating conditions.

|  | Operating range | Preferred |
|---|---|---|
| Acetone:water weight ratio | 0.1–0.8 | 0.1–0.25 |
| Magnesium slurry concentration g/100 g | 1–2 | 1.0–1.5 |
| Calcination, temp. °C. | 760–1200 | 800–1000 |
| Solution pH | 1–2 | 1.0–1.5 |

The following acceptable and preferred operating conditions may be used to selectively extract dolomite from phosphatic limestone with mixtures of cyclohexanone and sulfurous acid.

|  | Operating range | Preferred |
|---|---|---|
| Cyclohexanone:water weight ratio | 0.05–0.30 | 0.15–0.30 |
| Dolomite slurry concentration, g/100 g | 1–15 | 1–15 |
| Extraction temp., °C. | 60–90 | 75–90 |
| Sulfur dioxide excess, % | 8–30 | 10–30 |

Because calcite is so much more reactive than dolomite, this range of operating conditions is also satisfactory for selective calcite extraction.

The variability in calcite, dolomite, and apatite reactivity preclude specifying a unique set of operating conditions which are applicable to all rock types. But, with the rock types tested, higher extraction temperature favored dolomite extraction. Higher acetone concentration favored calcite and dolomite extraction. Higher cyclohexanone concentration also favored dolomite extraction.

What we claim as new and desire to secure by Letters Patent of the United States is:

1. A process for removing calcite and dolomite from calcined, uncalcined phosphate rock, phosphatic limestone, or mixtures thereof, which contains up to about 60 percent calcite and up to about 60 percent dolomite by the use of sulfur dioxide, water, and cyclohexanone which comprises the following steps:

(1) mixing said phosphate rock, said phosphatic limestone, or both, with water, sulfur dioxide and cyclohexanone while maintaining the temperature of said reaction mixture between 60° C. and 90° C. for a period of time sufficient to add up to about 50 percent excess sulfur dioxide over the stoichiometric amount required to form magnesium and calcium bisulfite salts wherein for each 100 g of solvent used, phosphate rock or phosphatic limestone containing about 1 to 15 grams of dolomite is used and wherein the cyclohexanone concentration of the water-cyclohexanone solvent ranges from 4.8 percent to 23 percent;
   (2) separating the solids from the liquid from step 1, supra;
   (3) drying said solids from step 2, supra;
   (4) condensing gaseous products from step 3, supra, and returning said condensate to step 1, supra;
   (5) distilling filtrate from step 2 supra until the distillate temperature reaches about 55° C.;
   (6) condensing the distillate from step 5 supra and returning said condensate to step 1, supra;
   (7) separating calcium sulfite hemihydrate from the undistilled filtrate of step 5, supra;
   (8) heating the separated calcium sulfite hemihydrate of step 7, supra, to remove sulfur dioxide, water, and cyclohexanone from the calcium sulfite;
   (9) condensing the offgas from step 8, supra, and returning it to step 1, supra;
   (10) distilling sulfur dioxide, water, and cyclohexanone from the filtrate of step 7, supra, until the distillate temperature reaches between about 90° C. and about 100° C.;
   (11) separating magnesium sulfite trihydrate from the undistilled liquid of step 10, supra; and
   (12) returning the liquid back to step 1, supra;
   (13) condensing the distillate step 10, supra, and returning the condensate back to step 1, supra;
   (14) heating the separated magnesium sulfite crystals recovered from step 11, supra;
   (15) condensing the offgas from step 14, supra; and
   (16) returning the condensate to step 1, supra.

2. The process of claim 1 wherein the temperature of the reaction mixture in step 1 thereof is maintained in the range from 75° C. to 90° C.

* * * * *